(12) United States Patent
Nagata et al.

(10) Patent No.: US 6,283,501 B1
(45) Date of Patent: Sep. 4, 2001

(54) STEERING WHEEL

(75) Inventors: Norinari Nagata, West Bloomfield, MI (US); Atsushi Nagata, Inazawa (JP); Katsunobu Sakane; Masafumi Kurokawa, both of Ichinomiya (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/161,234

(22) Filed: Sep. 28, 1998

(30) Foreign Application Priority Data

Sep. 29, 1997 (JP) .................................................. 9-264607
Oct. 21, 1997 (JP) .................................................. 9-288736

(51) Int. Cl.[7] ................................................ B60R 21/22
(52) U.S. Cl. ........................................ 280/731; 250/728.3
(58) Field of Search .............................. 280/731, 728.1, 280/728.3

(56) References Cited

U.S. PATENT DOCUMENTS

| 5,308,106 | 5/1994 | Heidorn . | |
|---|---|---|---|
| 5,405,165 | * 4/1995 | Koide et al. ...................... | 280/728.3 |
| 5,449,196 | * 9/1995 | Ohno et al. ...................... | 280/728.3 |
| 5,499,841 | 3/1996 | Trojan et al. . | |
| 5,676,396 | 10/1997 | Fohl . | |
| 5,897,132 | * 4/1999 | Papandreou ...................... | 280/728.2 |
| 5,957,484 | * 9/1999 | Levine et al. .................... | 280/728.3 |
| 5,975,562 | * 11/1999 | Yamamoto et al. ............... | 280/728.3 |

FOREIGN PATENT DOCUMENTS

| 4133007 | 4/1992 | (DE) . |
|---|---|---|
| 4410041 | 9/1994 | (DE) . |
| 4423963 | 1/1996 | (DE) . |
| 791520 | 8/1997 | (EP) . |
| 2-133955 | 11/1990 | (JP) . |

* cited by examiner

Primary Examiner—Eric Culbreth
(74) Attorney, Agent, or Firm—Pillsbury Winthrop LLP (57) ABSTRACT

A steering wheel having a metal framework is disclosed. The framework includes an annular grip core, spoke cores extending inward from the grip core, a boss plate fixed on a steering shaft, and a frame located inside the grip core to connect the spoke cores. The steering wheel further includes a pad located in the grip core, an air bag device, and inserts embedded in the pad. The inserts include portions that are attached to the frame. The inserts prevent the pad from scattering when the air bag device is activated.

12 Claims, 10 Drawing Sheets

STEERING WHEEL

BACKGROUND OF THE INVENTION

The present invention relates to a steering wheel, and more specifically to a steering wheel having an air bag.

Generally, the steering wheel of a vehicle includes an annular grip, a pad located in the center of the grip ring, and spokes extending from the grip ring to the center. A metal grip core is embedded in the grip, and a metal spoke core is embedded in the spokes. A surface layer formed, for example, of polyurethane covers the grip core and the spoke core. A boss plate is fastened to the distal end of a steering shaft by a nut. After the boss plate is attached to the steering shaft, an air bag device is installed in the steering wheel. Then, the pad is mounted over the air bag device.

In recent years, to improve the design of steering wheels, it has been proposed that the surface layer and the pad be formed integrally (Japanese Unexamined Utility Model Publication No. 2-133955). In the steering wheel of the Japanese Publication, an insert is embedded in the pad to prevent scattering of the pad when the air bag device is activated. According to this publication, the insert is held on the metal core by resin foam.

However, during inflation of the air bag, the resin foam may be broken, and the insert may separate from the metal core. Therefore, the pad may scatter when opened by the inflation of the air bag.

SUMMARY OF THE INVENTION

The objective of the present invention is to provide a steering wheel that prevents the insert imbedded in the pad from breaking away when the pad is opened.

To achieve the above objective, a steering wheel of the present invention includes a metal grip core, metal spoke cores extending from the grip core towards its center, a boss plate for engaging a steering shaft, a frame located inside the grip core to connect the spoke cores, a pad located inside the grip core, an air bag device installed in the steering wheel behind the pad, and an insert embedded in the pad. The insert is attached to the steering wheel for preventing the pad from scattering when the air bag is activated.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described by reference to drawings.

Figure 1:
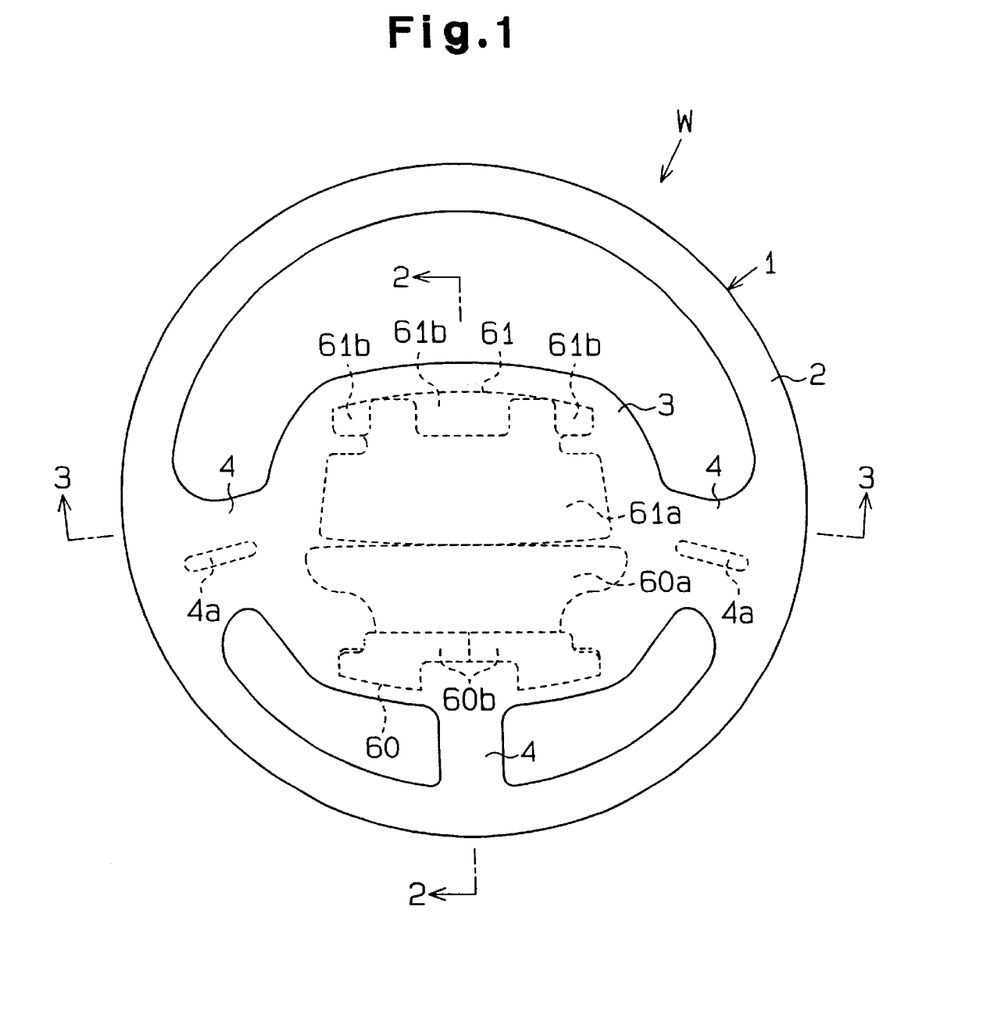
FIG. 1 is a plan view showing a steering wheel according to a first embodiment of the present invention.
Figure 2:
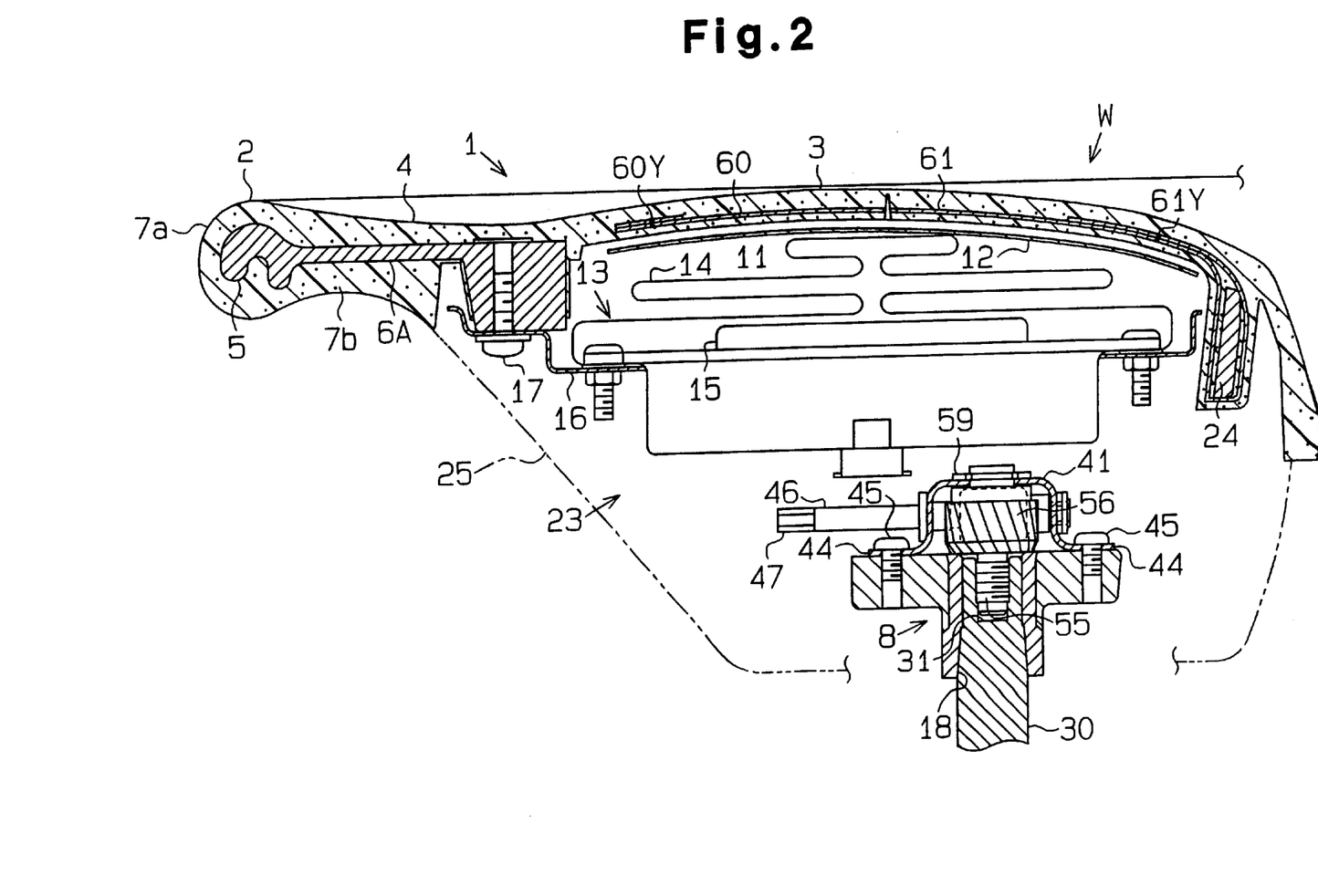
FIG. 2 is a sectional view taken on the line 2—2 of FIG. 1.
Figure 3:
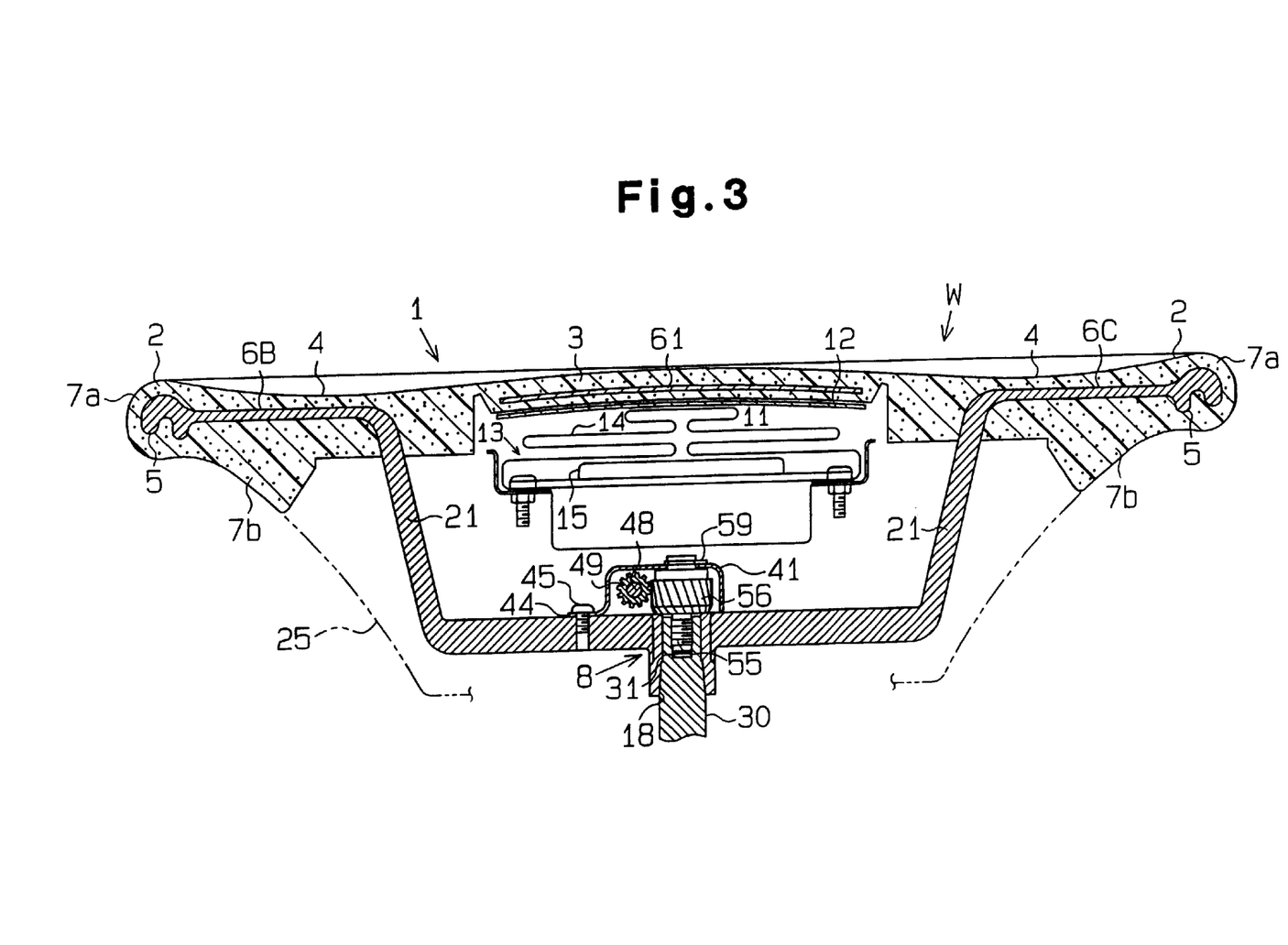
FIG. 3 is a sectional view taken on the line 3—3 of FIG. 1.

As shown in FIGS. 1–3, a wheel body 1 of a steering wheel W includes an annular grip 2, a pad 3 located in the center of the grip ring 2, and three spokes 4 extending from the grip ring 2. The grip ring 2 includes a metal grip core 5 and a surface layer 7a covering the grip core 5. The metal grip core is die cast, for example, of magnesium or magnesium alloy. The spokes 4 are formed by metal spoke cores 6A, 6B, 6C and a surface layer 7b for covering them. The metal spoke cores are made of the same metal as the metal grip core 5.

Figure 5:
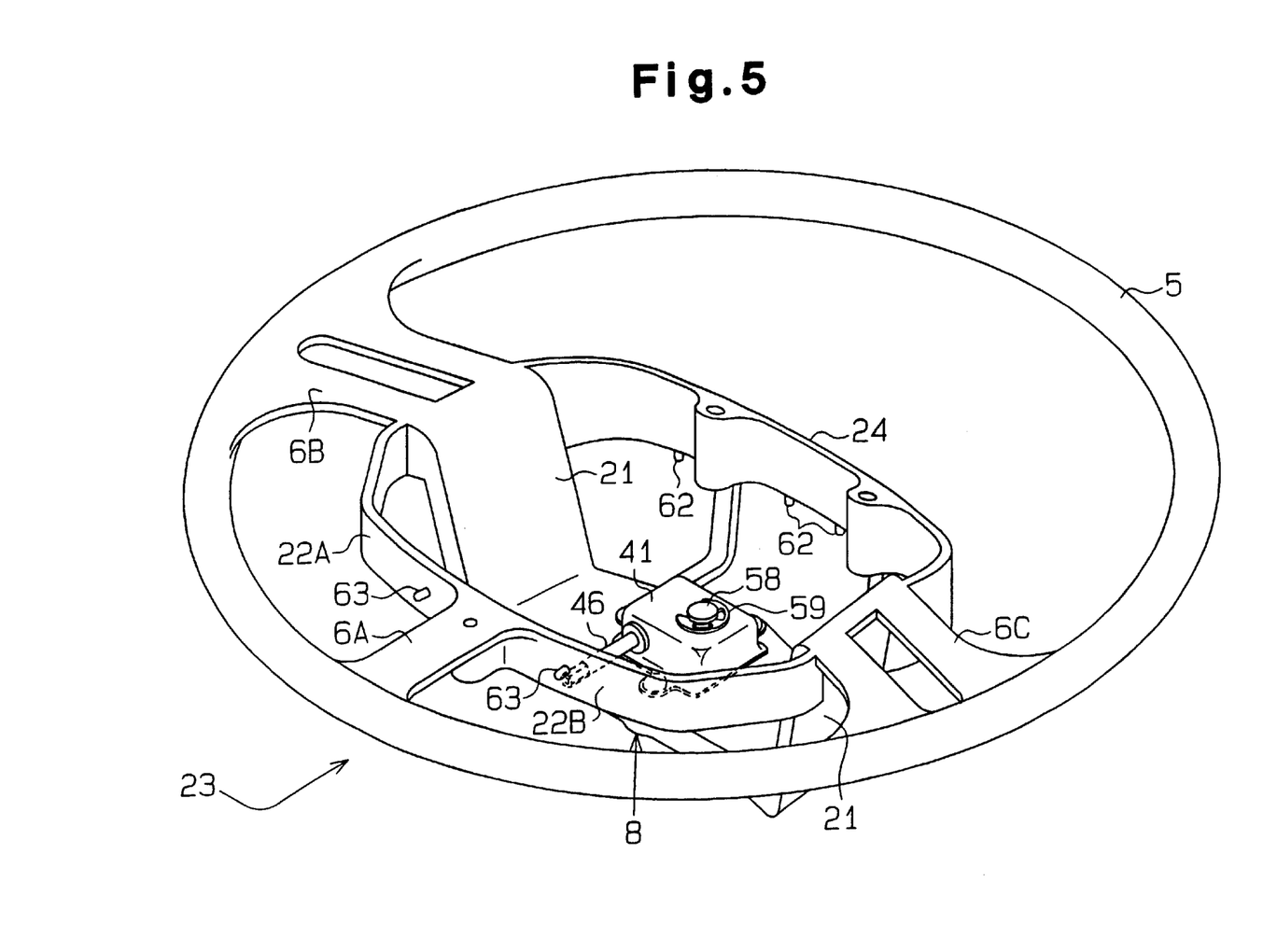
FIG. 5 is a perspective view showing a metal core structure of the steering wheel of FIG. 1.

As shown in FIGS. 3 and 5, the second metal spoke core 6B and the third metal spoke core 6C are joined to a boss plate 8 by arms 21. The first metal spoke core 6A is joined to the second spoke core 6B through a first frame 22A and is joined to the third spoke core through a second frame 22B. The spoke cores 6B, 6C are joined to one another by a third frame 24. In this way, the spoke cores 6A, 6B, 6C, the grip core 5, and the boss plate 8 are firmly joined. As shown in FIG. 2, a relatively large opening 23 is formed surrounded by the boss plate 8, the arms 21, and the first and second frames 22A, 22B.

The frames 22A, 22B, and 24 are curved. The frames 22A, 22B, and 24 are arranged on generally the same plane. The portion surrounded by these frames is generally rectangular.

The surface layers 7a, 7b, and the pad 3 are integrally formed of soft synthetic resin such as polyurethane foam. Shift switches 4a are provided in the spokes 4. Further, as shown in FIGS. 2 and 3, the rear surface of the steering wheel body 1 is covered with a resin back cover 25.

Behind the pad 3, an accommodation space 11 is formed surrounded by the frame 22A, 22B, 24, the arm 21, and the boss plate 8. The space 11 accommodates, for example, an air bag device 13, a horn switch (not shown), and a membrane switch 12. The membrane switch 12 includes a pair of thin plates forming part of the horn switch circuit. When the pad 3 is pressurized, the two thin plates contact one another and the horn is activated.

The air bag device 13 includes a folded air bag 14, an inflator 15 for supplying gas to the bag 14, and a holder 16 for holding the bag 14 and the inflator 15. The holder 16 is fixed to the spoke core 6A and the third frame 24.

An installation structure of the steering wheel W will now be described referring to FIGS. 6 and 7. As shown in FIG. 7, a hole 31 extends axially in the distal end of the steering shaft 30. An internal thread 31a is formed on the internal surface of the hole 31. An external taper 33 is formed proximally of the hole 31 on the periphery of the steering shaft 30. External splines 32 are provided on the external taper 33. There are a predetermined number (for example 30) of splines 32.

On the other hand, an internal taper 20, which corresponds to the external taper 33 of the steering shaft 30, is formed on the internal surface of an insertion hole 18. Internal splines 19, which correspond to the external splines 32 of the steering shaft 30, are formed on the internal taper 20.

Figure 6:
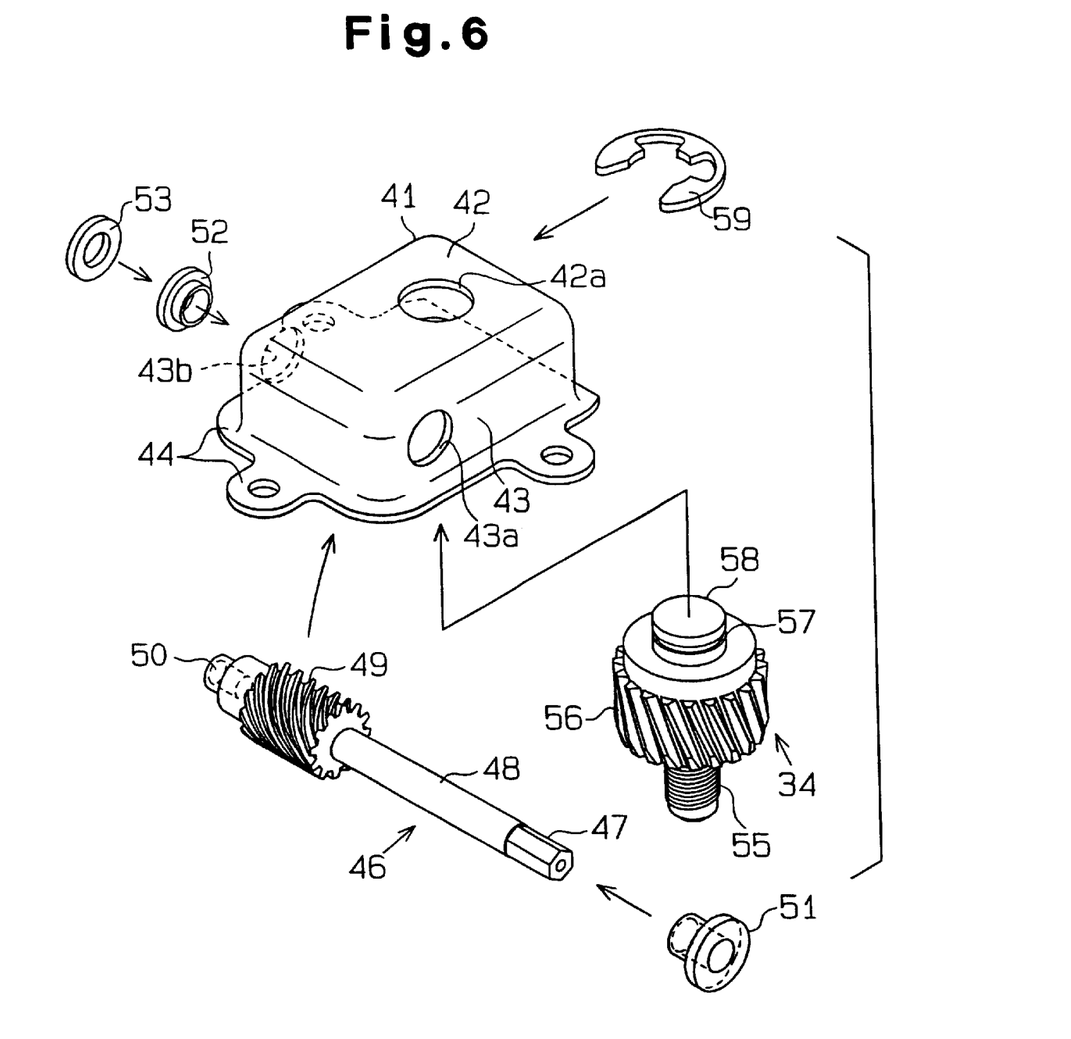
FIG. 6 is an exploded perspective view showing an apparatus for installing the steering wheel of FIG. 1 to a steering shaft.
Figure 7:
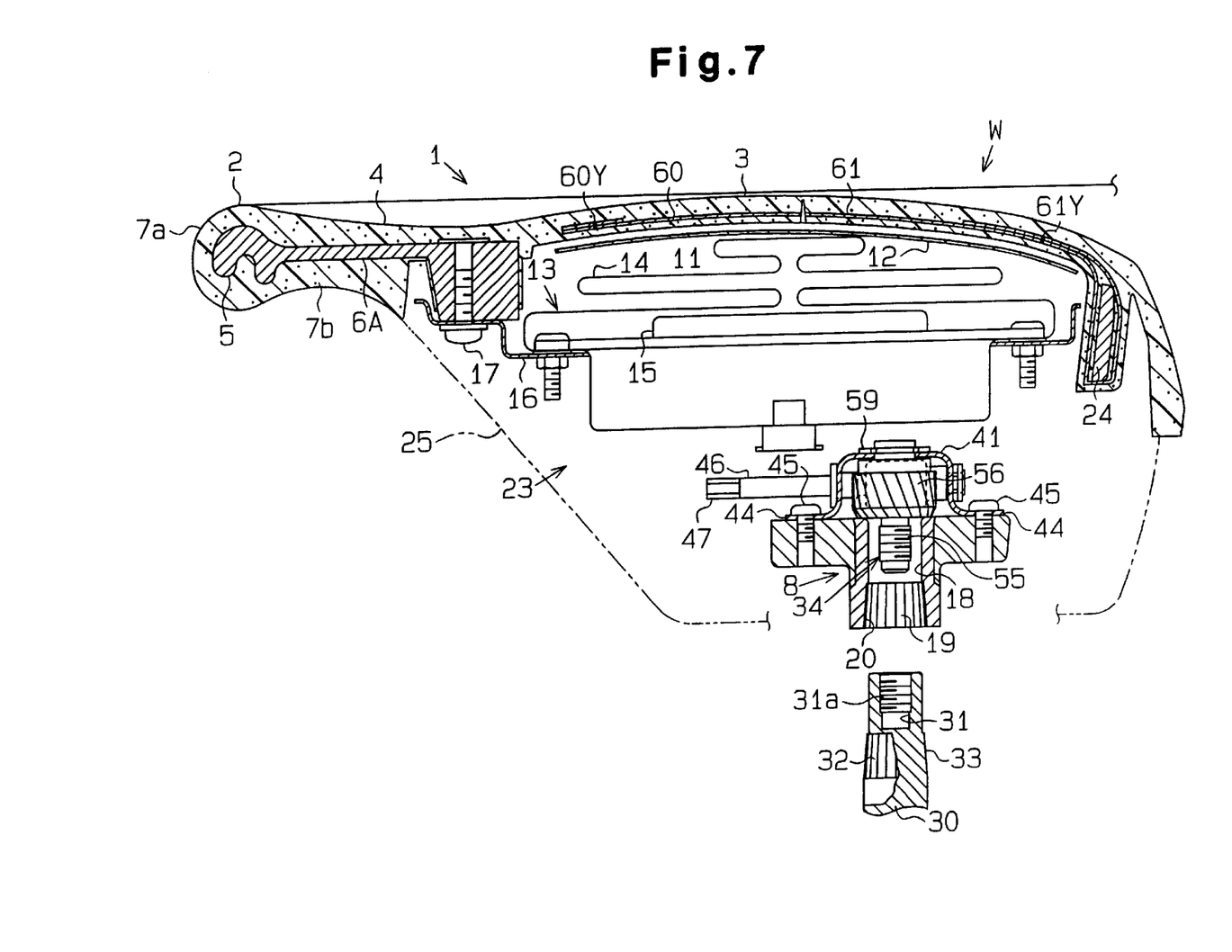
FIG. 7 is an exploded sectional view showing the assembly of the steering wheel to the steering shaft of FIG. 1.

As shown in FIGS. 6 and 7, a metal cap 41 is attached on the boss plate 8 to cover the insertion hole 18. The cap 41 includes a top wall 42, side walls 43, and a flange 44. The flange 44 is fixed to the boss plate 8 by bolts 45. Two holes 43a, 43b, which face one another, are formed on the side walls 43.

A worm tool 46 is attached to the cap 41 and is inserted through the first and second holes 43a, 43b. The tool 46 includes a hexagonal head 47, a shaft 48, a drive gear 49 having helical teeth, and a cylindrical portion 50.

The shaft 48 is attached to the first hole 43a through a bushing 51, which is made of synthetic resin or rubber. The head 47 projects from the first hole 43a. The cylindrical portion 50 is attached to the second hole 43b through another bushing 52. The distal end of the cylindrical portion 50 projects from the second hole 43b and is crimped by a crimping jig (not shown) to a washer 53.

The tool 46 can rotate about its axis. To rotate the tool 46, a torque great enough to overcome the friction between the bushings 51, 52 and the holes 43a, 43b, and the friction between the bushings 51, 52 and the tool 46, must be applied.

Further, a gear bolt 34 is provided in cap 41 the axis of which is perpendicular to that of the tool 46, that is, the gear bolt 34 is coaxial to the steering shaft 30. The gear bolt 34 includes a driven gear 56 having helical teeth, a threaded shaft 55, and a small diameter projection 58. The driven gear 56 meshes with the drive gear 49 of the tool 46. The threaded shaft 55 is screwed into the internal thread 31a of the steering shaft 30. An annular groove 57 is formed on the side of the projection 58.

The bolt 34 is fitted in a hole. 42a formed in the top wall 42 of the cap 41. The distal end of the projection 58 projects from the hole 42a, and the groove 57 is located outside the top wall 42. A snap ring 59 is fitted to the groove 57. This prevents chattering of the gear bolt 34 with respect to the cap 41, and the gear bolt 34 is supported to rotate about its axis. The driven gear 56 is meshed with the drive gear 49 of the tool 46, and the gear bolt 34 is rotated by the tool 46.

Figure 4:
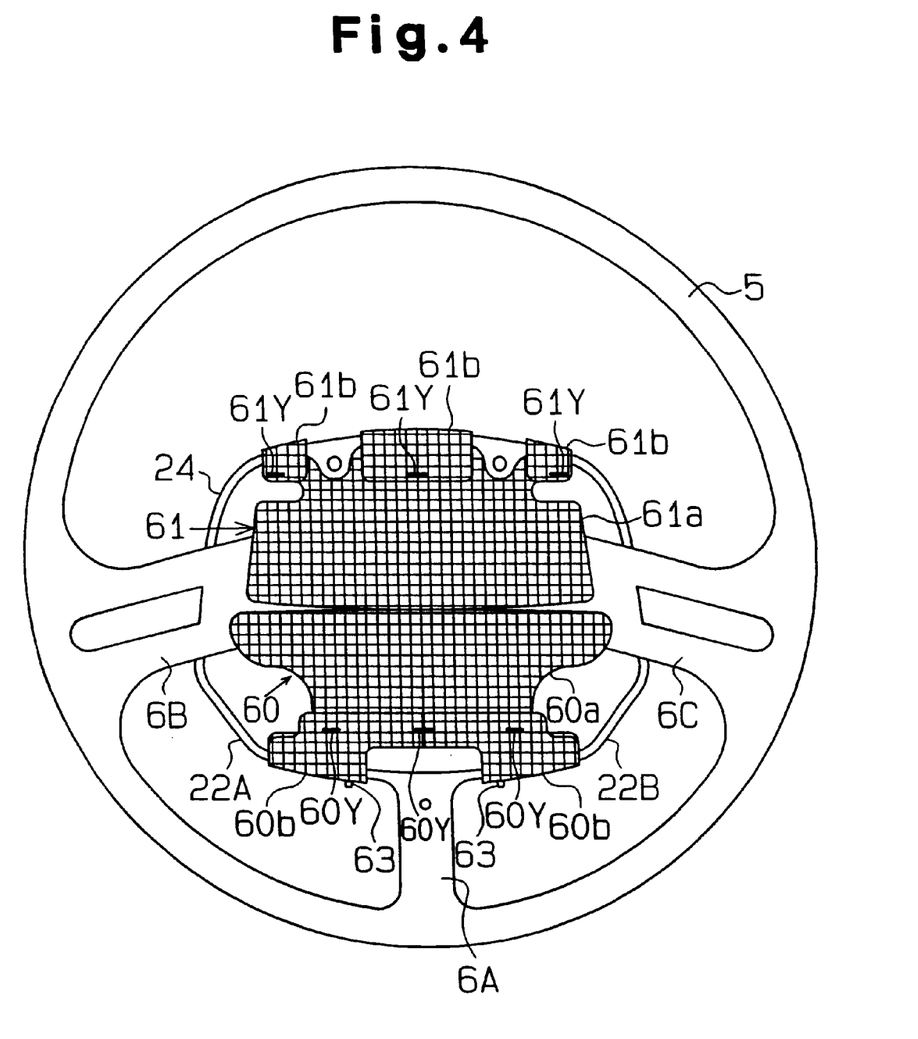
FIG. 4 is a plan view showing inserts attached to a metal core structure of the steering wheel of FIG. 1.

As shown in FIG. 2, first and second sheet-like inserts 60, 61 are embedded in the pad 3. As shown in FIG. 4, the first insert 60 is attached to the first and second frames 22A, 22B. The second insert 61 is attached to the third frame 24. The inserts 60, 61 are mesh-like nylon cloth coated with thermoplastic polyurethane.

Figure 8:
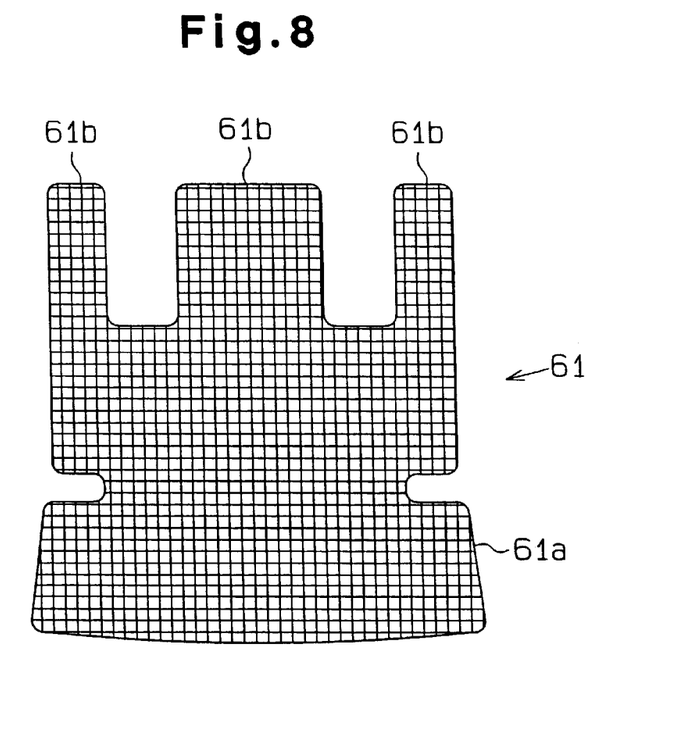
FIG. 8 is a plan view showing a second insert used for the steering wheel of FIG. 1.
Figure 9:
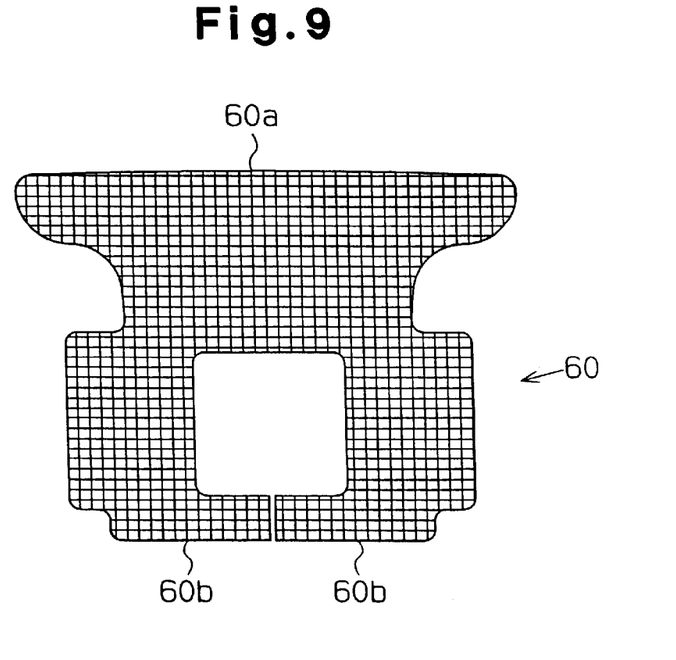
FIG. 9 is a plan view showing a first insert used for the steering wheel of FIG. 1.

The construction and the installation of the inserts 60, 61 will now be described in detail. First, the inserts 60, 61 are cut out in the shape shown in FIGS. 8 and 9. These shapes roughly correspond to H-shaped lines of weakness (not shown) on the surface of the pad 3 and to the frames 22A, 22B, and 24. The first insert 60 includes a developed portion 60a, corresponding to a lower half (seat side) of the pad in FIG. 1, and attachment portions 60b, which are wrapped around the frames 22A, 22B. Likewise, the second insert 61 includes a developed portion 61a, corresponding to an upper half of the pad 3 (the side closest to the vehicle operator) in FIG. 1, and attachment portions 61b wrapped around the frame 24.

As shown in FIG. 5, a plurality of projections 62 projecting backward of the steering wheel body 1 are integrally formed on the third frame 24. A plurality of projections 63 projecting toward the periphery of the wheel body 1 are integrally formed on the second and third frames 22A, 22B.

Figure 10:
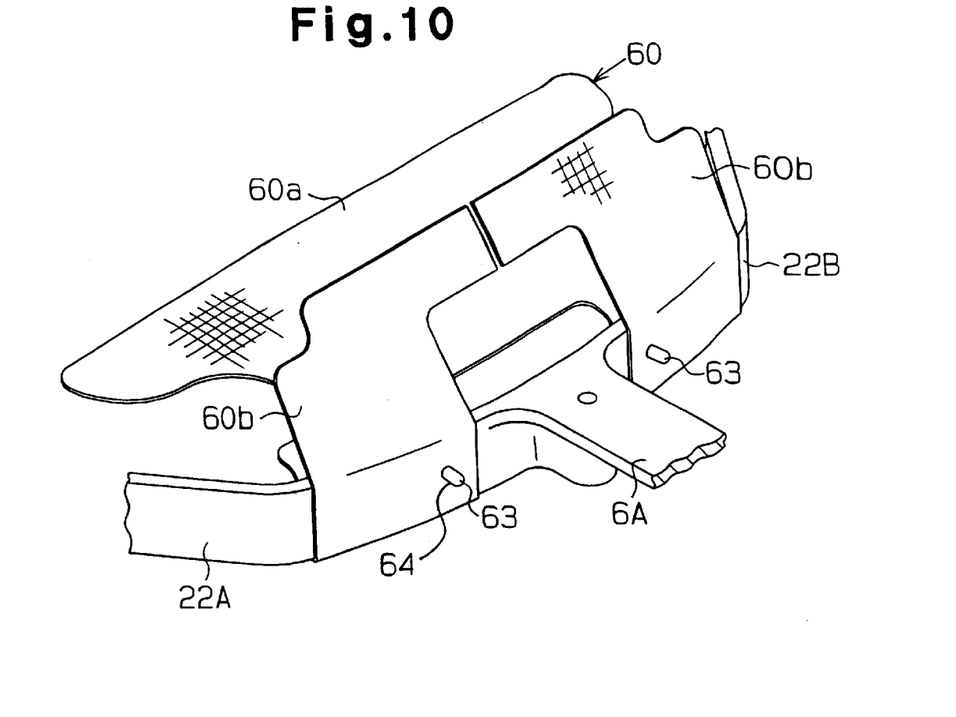
FIG. 10 is a perspective view showing the first insert hooked on the hook of first and second frames in the steering wheel of FIG. 1.

When attaching the first insert 60 to the first and second frames 22A, 22B, the attachment portions 60b are wrapped around the frames 22A, 22B as shown in FIG. 10. The mesh of the first insert 60 is hooked by projections 63, which properly positions the insert. Any proper arbitrary hole or preformed positioning hole 64 may be used instead of the mesh.

Figure 11:
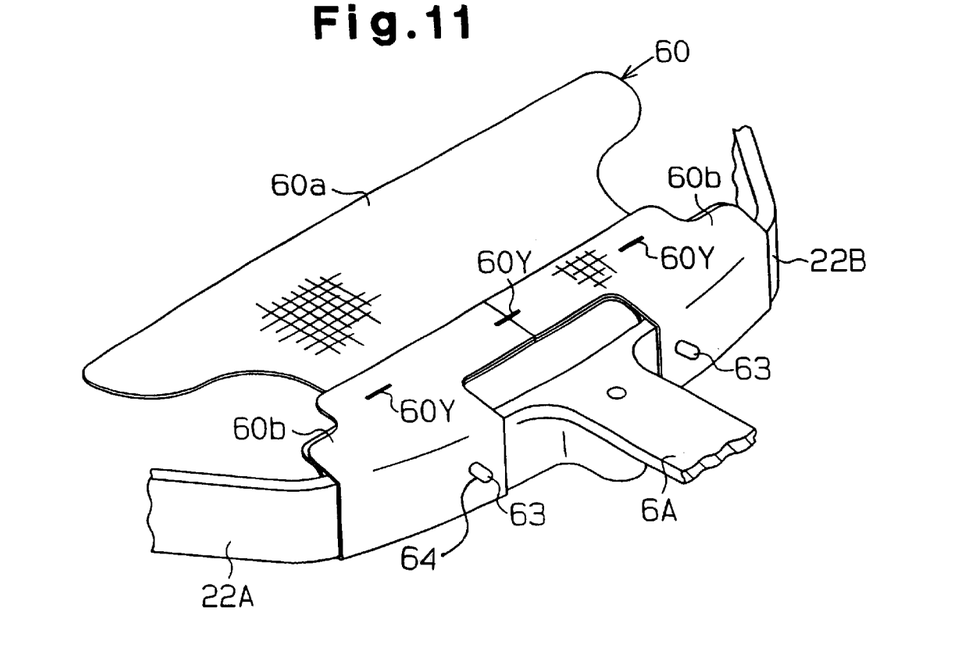
FIG. 11 is a perspective view showing the inserts fixed to the first and second frames of FIG. 10.

Subsequently, as shown in FIGS. 4 and 11, the distal ends of the attachment portions 60b of the first insert 60 are overlapped on the developed portion 60a. The overlapped part is fastened to the developed portion 60a at the fusion points 60Y by ultrasonic welding. In this embodiment, the first insert is fastened at three points.

The attachment portions 60b, 61b have outer edges that are not fused to the developed portion 60a, 61a. Accordingly, the strength of the outer edges is not reduced by fusing.

The second insert 61 is hooked and positioned by projections 62 (refer to FIG. 5) of the third frame 24. The attachment portions 61b are wrapped around the third frame 5 24 and fastened to the developed portion 61a by ultrasonic welding. In the present invention, the second insert 61 is fastened at three fusion points 61Y.

Further, the core to which the inserts 60, 61 are attached is set in a mold (not shown), and the pad 3 and the surface layers 7a, 7b are integrally molded to the core. Thus, the wheel body 1, which has the inserts 60, 61 embedded in the pad 3, is obtained.

Installation of the wheel body 1 on the steering shaft 30 will now be described.

Figure 12:
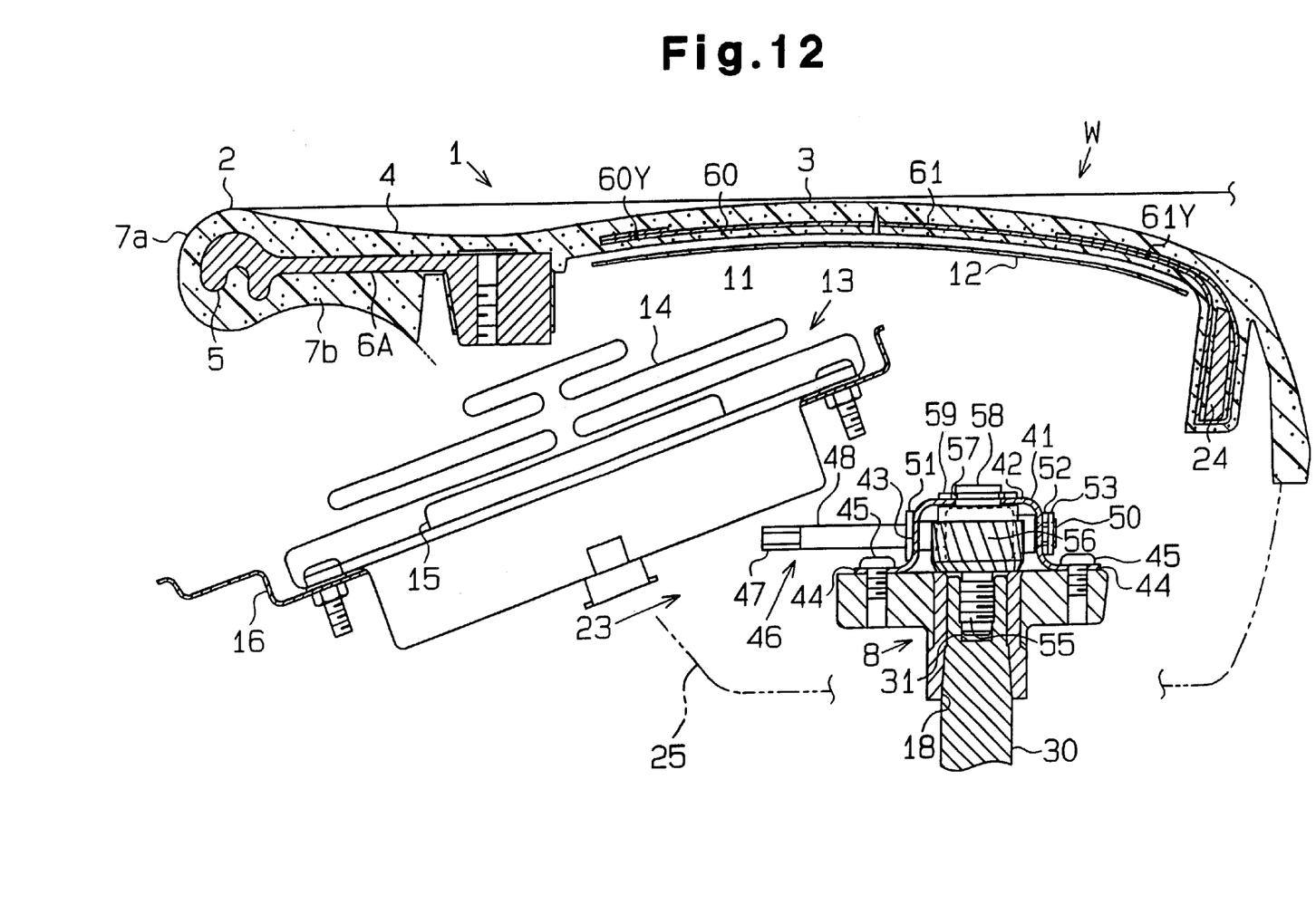
FIG. 12 is a sectional view showing how an air bag device is inserted in the steering wheel of FIG. 1 through the opening.

As shown in FIG. 12, the membrane switch 12 and an air bag device 13 are installed in the steering wheel W through the opening 23. The bag holder 16 is attached to the frames 22A, 22B, and 24 by the screws 17, the screws being shown in FIG. 2. The installation is easy due to the relatively large opening 23. Further, the projections 63 of the first and second frames 22A, 22B do not narrow the opening 23, thus the projections do not interfere with the insertion of the air bag device 13 and other apparatuses.

Subsequently, as shown in FIG. 7, the distal end of the steering shaft 30 is inserted in the insertion hole 18 of the boss plate 8. The splines 19 of the boss plate 8 are meshed with the splines 32 of the steering shaft 30.

In that state, a wrench (not shown) is inserted through a hole (not shown) of a lower cover 25, and the wrench is attached to the head 47, and the tool 46 is rotated in a predetermined direction. The rotation of the tool 46 is transmitted to the gear bolt 34 through the gear 49 and the gear 56, and the gear bolt rotates in a predetermined direction. As a result, the threaded shaft 55 of the gear bolt 34 is screwed into the hole 31 of the steering shaft 30, and the boss plate 8 is thus fixed on the steering shaft 30. Thus, the wheel body 1 is installed to the steering shaft 30, as shown in FIGS. 2 and 3.

The present embodiment has the following advantages.

The attachment portions 60b, 61b of the first and second inserts 60, 61 are wrapped around the first and second frames 22A, 22B and the third frame 24 and are fused, or welded. When the air bag device 13 is activated, the inflation of the air bag 14 breaks open the pad 3 along the lines of weakness on the surface of the pad 3. At this moment, the inserts 60, 61 receive force from the air bag 14, and the developed portions 60a, 61a open with the pad 3. Since the attachment portions are firmly fixed, the inserts 60, 61 are not separated from the frames 22A, 22B, 24. This prevents the pad 3, in which the inserts are embedded, from scattering.

The inserts 60, 61 are attached to the cores by welding. Welding does not deteriorate the strength of the inserts 60, 61, and the inserts are firmly fixed on the frames 22A, 22B, and 24.

The attachment portions 60b, 61b have the outer edges that are not fused to the developed portions. Therefore, the attachment portions 60b, 61b are fixed to the developed portions 60a, 61a without deteriorating the strength of the outer edges.

The inserts 60, 61 are hooked by the projections 63, 62, which are formed on the frames 22A, 22B, 24. Therefore, the inserts 60, 61 are more stable and are more firmly fixed.

The projections 63 corresponding to the first insert 60 is formed on the outer side of the first and second frames 22A, 22B, in a plane parallel to that of the grip ring 2. The pad 3 and the surface layers 7b, 7a are integrally formed, and the air bag device 13 is inserted through the opening 23 as shown in FIG. 12. The projections 63 do not interfere with the insertion. As a result, the air bag device 13 is easily installed.

The frames 22A, 22B, 24 are designed to connect the metal spoke cores 6A, 6B, 6C, and the frames are strong. Accordingly, the inserts 60 are firmly held and stable. Also, the frames 22A, 22B, 24 generally form a rectangular, and the inserts are attached on generally linear portions. This makes the attachment of the inserts 60, 61 easy.

The present invention is not limited to the above embodiment. The present invention may further be embodied as follows.

The method for attaching the overlapped part of the inserts 60, 61 is not limited to ultrasonic welding. For example, hot gas welding, high frequency welding, and friction welding may be employed, as long as the overlapped portions of the inserts 60, 61 are fastened.

The number and position of the fusion points 60Y, 61Y of the inserts 60, 61 is not limited as long as the inserts are firmly fixed on the frames 22A, 22B, 24.

Any material, such as, the same cloth used for the air bag 14, may be employed for the inserts 60, 61, as long as the cloth has a predetermined flexibility and strength. Also, the inserts 60, 61 may be formed of resin.

Only one insert may be fixed on the first and second frames 22A, 22B.

The present embodiment is embodied in a three spoke type steering wheel W, however it may be embodied in a two spoke type, four spoke type or other types of steering wheels. In these cases, the insert is cut from a cloth to correspond to the lines of weakness (along which the pad separates when the air bag is activated) of the pad of the steering wheel.

The metal spoke cores 6A, 6B, 6C, the arm 21, the frames 22A, 22B, 24, and the boss plate 8 may be respectively formed as independent parts and then connected by bolts.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A steering wheel having an air bag device, said steering wheel comprising:
    a metal grip core;
    metal spoke cores extending inwardly from the metal grip core;
    a boss plate for engaging a steering shaft;
    a frame located interiorly of the metal grip core and interconnecting the metal spoke cores and the boss plate, wherein the frame has a plurality of parallel projections extending substantially parallel to a plane in which the metal grip core lies, at least one parallel projection being disposed on both sides of one of said metal spoke cores;
    an integrally formed steering wheel covering having a pad portion located centrally of the metal grip core;
    a scatter preventing insert embedded in the pad portion, said insert being attached to the frame by an attachment portion which is sufficiently long so that when wrapped around said frame an overlapping portion is formed that lies adjacent an overlapped part of the scatter preventing insert,
    said overlapping portion comprising two halves, each half of the overlapping portion being wrapped around said frame on both sides of said one of said metal spoke cores,
    wherein each of said at least one parallel projection engages with the attachment portion.

2. A steering wheel according to claim 1, wherein each half of the overlapping portion is fastened, by a fastener, to the overlapped part thereby securing the scatter preventing insert to the frame.

3. A steering wheel according to claim 2, wherein said fastener comprises fusing of the overlapping portions to the overlapped part.

4. A steering wheel according to claim 1, wherein the insert includes a cloth coated by thermoplastic polyurethane, said cloth being sufficiently porous so as to be infiltrated by pad material.

5. A steering wheel according to claim 1, wherein the parallel projections extend from the frame to engage corresponding preformed holes in said attachment portion to properly position the scatter preventing insert.

6. The steering wheel according to claim 1, wherein the frame on which the parallel projections are formed defines an installation opening through which the air bag device is installed.

7. The steering wheel according to claim 6, wherein the frame further comprises at least one perpendicular projection extending substantially perpendicular to the plane in which the metal grip core lies.

8. A steering wheel according to claim 7, further including a second scatter preventing insert attached to said frame so as to cover the air bag device and be embedded within said pad, said second insert having an attachment portion.

9. A steering wheel according to claim 8, wherein said insert is attached to one side of the frame, and the second insert is attached to an opposite side of the frame.

10. A steering wheel according to claim 9, wherein said second insert is attached to the frame by an attachment portion which is sufficiently long so that when wrapped around said frame an overlapping portion is formed that lies adjacent an overlapped part of said second insert.

11. A steering wheel according to claim 10, wherein said at least one perpendicular projection engages a corresponding preformed hole in said attachment portion of said second insert to properly position the second insert.

12. A vehicle steering wheel according to claim 1, wherein the pad portion includes a tear seam, along which the pad portion is allowed to separate when the air bag device is activated, said tear seam being positioned between said insert and said second insert.

\* \* \* \* \*